(12) United States Patent
Crabtree et al.

(10) Patent No.: US 12,537,859 B2
(45) Date of Patent: Jan. 27, 2026

(54) CREATING SIMULATION MODELS FOR COMPLEX ADAPTIVE SYSTEMS USING A MULTI-MODEL, GENERATIVE APPROACH

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 143 days.

(21) Appl. No.: 18/595,462

(22) Filed: Mar. 5, 2024

(65) Prior Publication Data

US 2024/0214427 A1    Jun. 27, 2024

Related U.S. Application Data

(63) Continuation of application No. 17/185,655, filed on Feb. 25, 2021, now Pat. No. 12,225,049, which is a continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of application No. 17/000,504, filed on Aug. 24, 2020, now Pat. No. 11,477,245, which is a
(Continued)

(51) Int. Cl.
*H04L 9/40*        (2022.01)
*G06F 9/50*        (2006.01)
*G06F 16/2458*     (2019.01)
*G06F 16/951*      (2019.01)
*G06F 9/48*        (2006.01)
*G06F 9/54*        (2006.01)

(52) U.S. Cl.
CPC ............ *H04L 63/20* (2013.01); *G06F 9/5038* (2013.01); *G06F 16/2477* (2019.01); *G06F 16/951* (2019.01); *H04L 63/1425* (2013.01); *H04L 63/1441* (2013.01); *G06F 9/4881* (2013.01); *G06F 9/54* (2013.01)

(58) Field of Classification Search
CPC . H04L 63/20; H04L 63/1425; H04L 63/1441; G06F 16/2477; G06F 16/951; G06F 9/5038
See application file for complete search history.

(56) References Cited

U.S. PATENT DOCUMENTS 5,669,000 A    9/1997    Jessen et al.
6,256,544 B1   7/2001    Weissinger
(Continued)

FOREIGN PATENT DOCUMENTS

WO    2014159150 A1    10/2014
WO    2017075543 A1    5/2017

*Primary Examiner* — Oleg Korsak
(74) *Attorney, Agent, or Firm* — Galvin Patent Law LLC; Brian R Galvin

(57) ABSTRACT

A system and method for multi-model generative simulation modeling of complex adaptive systems, comprising a generative simulation platform, a multidimension time series datastore, and a directed computational graph, capable of running a multitude of simulations with complex and shifting model data, and an optimization engine which can introduce changes into a simulation to represent unforeseen or random changes and events to introduce changes and shifts in the simulation that might not otherwise occur.

24 Claims, 13 Drawing Sheets

Related U.S. Application Data continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, which is a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, and a continuation-in-part of application No. 15/835,312, filed on Dec. 7, 2017, now Pat. No. 11,055,451, said application No. 16/720,383 is a continuation-in-part of application No. 15/823,363, filed on Nov. 27, 2017, now Pat. No. 10,560,483, said application No. 15/887,496 is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, which is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, and a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, and a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, and a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, said application No. 15/141,752 is a continuation-in-part of application No. 14/986,536, filed on Dec. 31, 2015, now Pat. No. 10,210,255, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(56) References Cited

U.S. PATENT DOCUMENTS

| | | |
|---|---|---|
| 7,072,863 B1 | 7/2006 | Phillips et al. |
| 7,818,224 B2 | 10/2010 | Boerner |
| 7,818,417 B2 | 10/2010 | Ginis et al. |
| 7,840,677 B2 | 11/2010 | Li et al. |
| 8,069,190 B2 | 11/2011 | McColl et al. |
| 9,338,061 B2 | 5/2016 | Chen et al. |
| 9,639,575 B2 | 5/2017 | Leida et al. |
| 10,168,691 B2 | 1/2019 | Zornio et al. |

(56) References Cited

U.S. PATENT DOCUMENTS

| | | |
|---|---|---|
| 10,332,210 B1 * | 6/2019 | Kemp .................... G06Q 40/08 |
| 10,360,214 B2 | 7/2019 | Gold et al. |
| 10,445,697 B2 * | 10/2019 | Li .......................... G06Q 10/10 |
| 10,740,358 B2 | 8/2020 | Chan et al. |
| 2007/0021955 A1 | 1/2007 | Tolone et al. |
| 2007/0043656 A1 | 2/2007 | Lancaster |
| 2008/0027690 A1 | 1/2008 | Watts |
| 2008/0221949 A1 | 9/2008 | Delurgio et al. |
| 2009/0112541 A1 | 4/2009 | Anderson et al. |
| 2009/0222562 A1 | 9/2009 | Liu et al. |
| 2011/0208681 A1 | 8/2011 | Kuecuekyan |
| 2012/0116743 A1 | 5/2012 | Ayala et al. |
| 2012/0266244 A1 | 10/2012 | Green et al. |
| 2013/0290554 A1 | 10/2013 | Chen et al. |
| 2014/0156806 A1 | 6/2014 | Karpistsenko et al. |
| 2014/0279762 A1 | 9/2014 | Xaypanya et al. |
| 2015/0149979 A1 | 5/2015 | Talby et al. |
| 2015/0169294 A1 | 6/2015 | Brock et al. |
| 2015/0186427 A1 | 7/2015 | Logothetis et al. |
| 2015/0379424 A1 | 12/2015 | Dirac et al. |
| 2016/0078361 A1 | 3/2016 | Brueckner et al. |
| 2016/0092557 A1 | 3/2016 | Stojanovic et al. |
| 2016/0164905 A1 | 6/2016 | Pinney Wood et al. |
| 2016/0275123 A1 | 9/2016 | Lin et al. |
| 2016/0364307 A1 | 12/2016 | Garg et al. |
| 2017/0006135 A1 | 1/2017 | Siebel et al. |
| 2017/0090893 A1 | 3/2017 | Aditya et al. |
| 2017/0193110 A1 | 7/2017 | Crabtree et al. |
| 2017/0323089 A1 | 11/2017 | Duggal et al. |
| 2018/0321421 A1 | 11/2018 | Halabe et al. |
| 2020/0005523 A1 | 1/2020 | Brebner |
| 2020/0012890 A1 | 1/2020 | Watson et al. |
| 2021/0357702 A1 * | 11/2021 | Jaw ......................... G06V 30/41 |

* cited by examiner

CREATING SIMULATION MODELS FOR COMPLEX ADAPTIVE SYSTEMS USING A MULTI-MODEL, GENERATIVE APPROACH

CROSS-REFERENCE TO RELATED APPLICATIONS

Priority is claimed in the application data sheet to the following patents or patent applications, each of which is expressly incorporated herein by reference in its entirety:
Ser. No. 17/185,655
Ser. No. 17/035,029
Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
62/568,312
Ser. No. 15/616,427
Ser. No. 14/925,974
62/568,305
62/568,307
Ser. No. 15/818,733
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 16/777,270
Ser. No. 16/720,383
Ser. No. 15/823,363
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
62/568,291
62/568,298
Ser. No. 15/835,312
Ser. No. 15/813,097
Ser. No. 15/806,697
Ser. No. 15/376,657
Ser. No. 15/343,209
Ser. No. 15/229,476
Ser. No. 15/673,368

BACKGROUND OF THE INVENTION

Field of the Art

The disclosure relates to the field of digital simulation, more specifically to the field of adaptive multi-model simulations.

Discussion of the State of the Art

It is currently the case that simulation systems are incapable of, or extremely limited in, adapting to real-world data and constant input streams during simulation execution. Moreover, simulation systems of these sorts are typically not able to run multiple simulations at once, or provide randomized or targeted automated parameter adjustment during simulation execution to represent unforeseen or unknown variable changes and events occurring. These shortcomings have drastic effects for simulations relating to financial markets and risk assessment, pathogen spread and containment simulations, pathogen mutation simulations, networking simulations, various simulations related to complex engineering problems where real-world applications and being able to handle unforeseen changes are paramount, and more.

What is needed is a system and method for multi-model generative simulation modeling of complex adaptive systems.

SUMMARY OF THE INVENTION

Accordingly, the inventor has conceived and reduced to practice, in a preferred embodiment of the invention, a system and methods for multi-model generative simulation modeling of complex adaptive systems. The following non-limiting summary of the invention is provided for clarity, and should be construed consistently with embodiments described in the detailed description below.

To solve the problem of non-adaptive and cumbersome simulation modeling technology, a system for multi-model generative simulation modeling of complex adaptive systems is disclosed.

According to a preferred embodiment, a computing system for multi-model generative simulation modeling of complex adaptive systems employing generative simulation platform, the computing system comprising: one or more hardware processors configured for: receiving some combination of object, environment, or simulation data from a resource over a network; receiving a plurality of perils for analysis; parsing the received combination of data using pattern recognition; parameterizing the parsed data into objects for model building; creating and run a first model for analysis of the plurality of perils from the objects for model building to generate a first set of synthetically generated data; creating and run a second model for analysis of the plurality of perils by altering parameters of the first model to simulate random or unknown events occurring to generate a second set of synthetically generated data; creating and run a third model for analysis of the plurality of perils from the first model, the third model having isolated groups of the objects for model building, to generate a third set of synthetically generated data; creating a fourth data set using analyzed data based at least in part on the plurality of perils; creating a fifth data set by: retrieving the first, second, and third sets of synthetically generated data based at least on the plurality of perils; and analyzing the relationships of the second and third sets of synthetically generated data against the first set of synthetically generated data; comparatively analyzing the fourth data set against the fifth data set to determine an optimal model to use for predictive simulation of the plurality of perils; receiving a data processing workflow in the form of a graph comprising nodes representing data transformations and edges representing messages passed between the nodes; retrieving the first, second, and third models for evaluation according to the data processing workflow of the graph; instantiating a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems; performing an initial execution of each of the first, second, and third models using the instantiated plurality of data processing pipelines on the distributed computing network using a set of initial parameters to obtain a model result for each of the first, second, and third models; and determining an epistemic uncertainty value of the first model by comparing the model result of the first model with the model results of the second and third models.

According to another preferred embodiment, a computer-implemented method executed on a generative simulation platform for multi-model generative simulation modeling of complex adaptive systems, the computer-implemented method comprising: receiving some combination of object, environment, or simulation data from a resource over a network; receiving a plurality of perils for analysis; parsing the received combination of data using pattern recognition; parameterizing the parsed data into objects for model building; creating and run a first model for analysis of the plurality of perils from the objects for model building to generate a first set of synthetically generated data; creating and run a second model for analysis of the plurality of perils by altering parameters of the first model to simulate random or unknown events occurring to generate a second set of synthetically generated data; creating and run a third model for analysis of the plurality of perils from the first model, the third model having isolated groups of the objects for model building, to generate a third set of synthetically generated data; creating a fourth data set using analyzed data based at least in part on the plurality of perils; creating a fifth data set by: retrieving the first, second, and third sets of synthetically generated data based at least on the plurality of perils; and analyzing the relationships of the second and third sets of synthetically generated data against the first set of synthetically generated data; comparatively analyzing the fourth data set against the fifth data set to determine an optimal model to use for predictive simulation of the plurality of perils; receiving a data processing workflow in the form of a graph comprising nodes representing data transformations and edges representing messages passed between the nodes; retrieving the first, second, and third models for evaluation according to the data processing workflow of the graph; instantiating a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems; performing an initial execution of each of the first, second, and third models using the instantiated plurality of data processing pipelines on the distributed computing network using a set of initial parameters to obtain a model result for each of the first, second, and third models; and determining an epistemic uncertainty value of the first model by comparing the model result of the first model with the model results of the second and third models.

According to another preferred embodiment, a system for multi-model generative simulation modeling of complex adaptive systems employing a generative simulation platform, comprising one or more computers with executable instructions that, when executed, cause the system to: receive some combination of object, environment, or simulation data from a resource over a network; receive a plurality of perils for analysis; parse the received combination of data using pattern recognition; parameterize the parsed data into objects for model building; create and run a first model for analysis of the plurality of perils from the objects for model building to generate a first set of synthetically generated data; create and run a second model for analysis of the plurality of perils by altering parameters of the first model to simulate random or unknown events occurring to generate a second set of synthetically generated data; create and run a third model for analysis of the plurality of perils from the first model, the third model having isolated groups of the objects for model building, to generate a third set of synthetically generated data; create a fourth data set using analyzed data based at least in part on the plurality of perils; create a fifth data set by: retrieving the first, second, and third sets of synthetically generated data based at least on the plurality of perils; and analyzing the relationships of the second and third sets of synthetically generated data against the first set of synthetically generated data; comparatively analyze the fourth data set against the fifth data set to determine an optimal model to use for predictive simulation of the plurality of perils; receive a data processing workflow in the form of a graph comprising nodes representing data transformations and edges representing messages passed between the nodes; retrieve the first, second, and third models for evaluation according to the data processing workflow of the graph; instantiate a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems; perform an initial execution of each of the first, second, and third models using the instantiated plurality of data processing pipelines on the distributed computing network using a set of initial parameters to obtain a model result for each of the first, second, and third models; and determine an epistemic uncertainty value of the first model by comparing the model result of the first model with the model results of the second and third models.

According to another preferred embodiment, non-transitory, computer-readable storage media having computer-executable instructions embodied thereon that, when executed by one or more processors of a computing system employing a generative simulation platform for multi-model generative simulation modeling of complex adaptive systems, cause the computing system to: receive some combination of object, environment, or simulation data from a resource over a network; receive a plurality of perils for analysis; parse the received combination of data using pattern recognition; parameterize the parsed data into objects for model building; create and run a first model for analysis of the plurality of perils from the objects for model building to generate a first set of synthetically generated data; create and run a second model for analysis of the plurality of perils by altering parameters of the first model to simulate random or unknown events occurring to generate a second set of synthetically generated data; create and run a third model for analysis of the plurality of perils from the first model, the third model having isolated groups of the objects for model building, to generate a third set of synthetically generated data; create a fourth data set using analyzed data based at least in part on the plurality of perils; create a fifth data set by: retrieving the first, second, and third sets of synthetically generated data based at least on the plurality of perils; and analyzing the relationships of the second and third sets of synthetically generated data against the first set of synthetically generated data; comparatively analyze the fourth data set against the fifth data set to determine an optimal model to use for predictive simulation of the plurality of perils; receive a data processing workflow in the form of a graph comprising nodes representing data transformations and edges representing messages passed between the nodes; retrieve the first, second, and third models for evaluation according to the data processing workflow of the graph; instantiate a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems; perform an initial execution of each of the first, second, and third models using the instantiated plurality of data processing pipelines on the distributed computing network using a set of initial parameters to obtain a model result for each of the first, second, and third models; and determine an epistemic uncertainty value of the first model by comparing the model result of the first model with the model results of the second and third models.

According to an aspect of an embodiment, the generative simulation platform is used to simulate pathogen behavior and pathogen control methods.

According to an aspect of an embodiment, tasks, equations, and object groups may be decomposed into smaller tasks, equations, and groups for management.

According to an aspect of an embodiment, the generative simulation platform simulates an engineering task including a network engineering simulation.

According to an aspect of an embodiment, the generative simulation platform simulates complex events for purposes of pricing insurance and risk transfer.

According to an aspect of an embodiment, the system may be further caused to: perform parametric evaluation of the first model by iterating it over a range of values for one parameter of the set of initial parameters of the first model to determine the first model's sensitivity to changes in the one parameter using the instantiated plurality of data processing pipelines on the plurality of computer systems; change the one parameter of the first model to reduce the epistemic uncertainty based on the first model's sensitivity to the one parameter; and repeat the parametric evaluation, comparison, and model changes until the determined epistemic uncertainty value for the first model falls below a pre-determined threshold.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
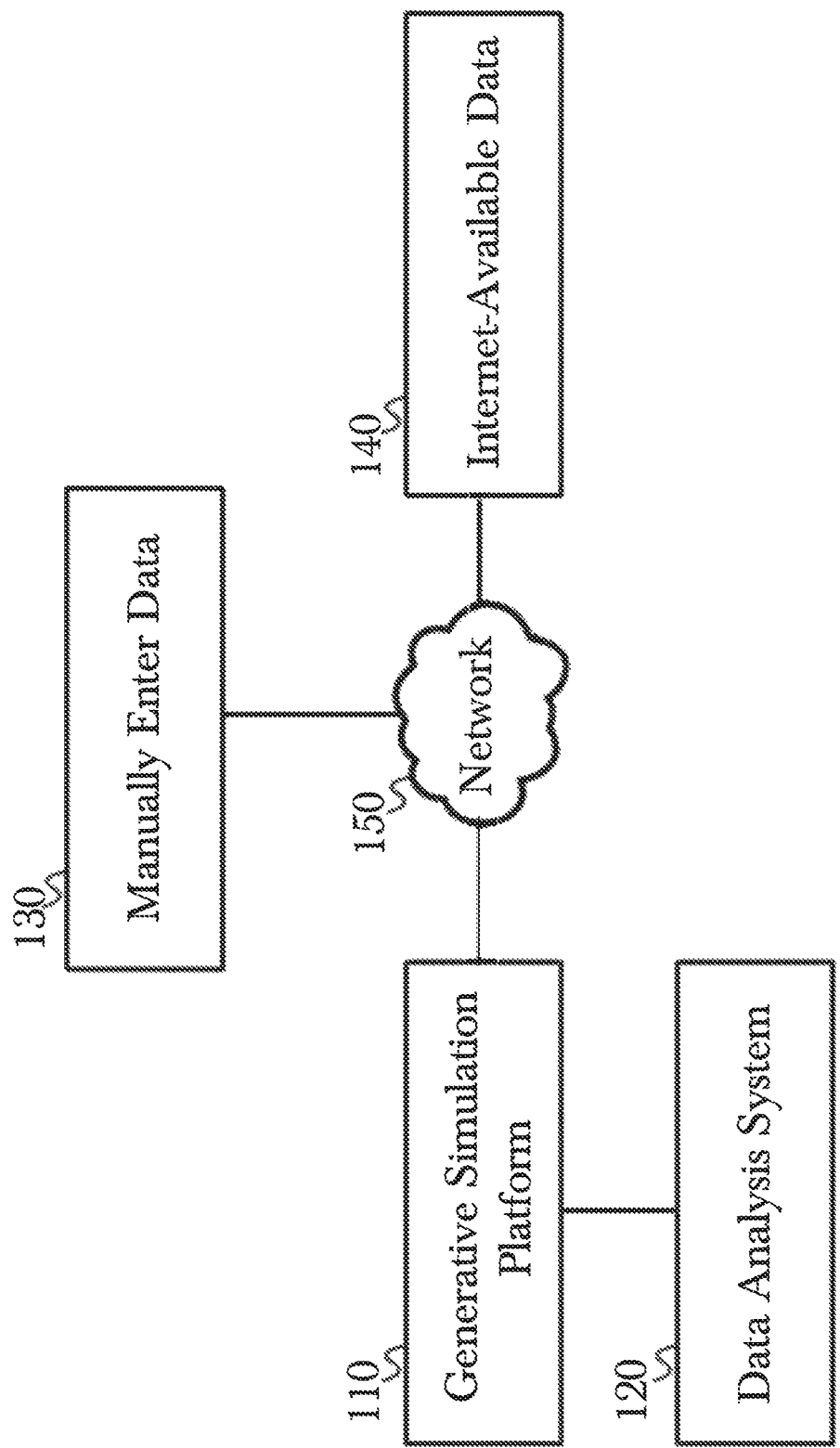
FIG. 1 is a system diagram showing high-level components in a generative simulation platform's operation, according to a preferred aspect.

The inventor has conceived, and reduced to practice, a system and method for multi-model generative simulation modeling of complex adaptive systems.

To this end, systematic identification of significant prospective causal drivers (referring to model causality and not to real-world system causality per se) based on the potential for various combined descriptions of system input/output states, characteristics and behaviors may be used to accurately correspond data to observed phenomena. Furthermore, the same approach restated can be viewed as a tool for the identification of primary sources of model error or bias for generative models. If restated, one can refer to the isolation of factors contributing to the uncertainty of a generative model for use in prediction.

Large scale parametric studies can be used to help isolate various causal drivers, especially when historical data is viewed from the perspective of itself being a particular expressed path from a distribution of hypothetical histories and not a precise reflection of the underlying distribution(s) itself. In other words, by examining a historical trend or set of historical data on a problem or trend, and beginning a simulation at a certain point in that historical trend and modeling forward, one can identify alternate paths from what actually occurred in the trend, and it may be possible to isolate causal drivers that resulted in the differences between simulations versus actual historical trend.

One example of this is looking at historical returns (e.g. the Insurance-Linked Securities (ILS) market). One can take various financial and societal data such as the overall strength of an economy, various stock indexes, and more, and examine a specific industry such as the ILS market, from a certain year, and proceed to simulate several years ahead, comparing with what actually happened in these years, to fine-tune and examine specific causal drivers that may have been at play. In this way, a more precise simulation for future years that have not yet occurred may be specified, for increased precision in the prediction of financial markets.

A related concept is exploration of the economic benefits of reducing uncertainty in different model areas. For very complex problems, an optimization engine may be used to aid in the decomposition of the broader problem domain to improve the rate at which we can gain information via decentralized learning for parameter isolation where various artifacts within the world, population, or even individual agents may be more controlled, or experience less variation, which might contribute to overall uncertainty contributions. This is a means of leveraging simulations to develop more optimal experimental processes and controls that blend real-world observations with simulated world happenings.

For many behavioral cases (e.g. health, markets, etc . . . ) model accuracy may atrophy as new model biases are introduced based upon changing societal norms, incentives or cultures, if models are not updated or attached to a continually updating data source, such as a source of metadata including object types and relationships. Additionally, these model biases may change at different rates and have different starting points or weightings within different regions and cultures. By running parametric studies on various types of agent and population dynamics (which can include different rates of information propagation) one may gain better generative models for predicting individual and population outcomes.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a system diagram showing high-level components in a generative simulation platform's 110 operation, according to a preferred aspect. A generative simulation platform 110 exists as a specific computer system, a computer system's minimal components and functionality being described in FIG. 10-13, and which operates a data analysis system 120. The data analysis system 120 may be used to run advanced and dynamic simulations based on a plurality of models at a user's discretion, utilizing multidimensional time-series datastores 220 and a directed computational graph module 255 to monitor and allow analysis of the results of ongoing simulations as they change over time. Such simulations may include analyzing the spread, contamination, destruction of, or mutation of a pathogen, as outlined in FIG. 7, or may be simulations of complex engineering problems such as described in both FIG. 8 and FIG. 9, including problems related to networking and list problems as described in FIG. 9. The generative simulation platform 110 and data analysis system 120 are not limited by the context or content of a simulation and may be configured to run any number of complex or large-scale simulations as needed. A generative simulation platform 110 is connected to a network 150, which may allow manually entered data remotely 130 as well as data acquired over the internet 140 such as publicly available data or data accessed over a database. An example of internet-available data 140 may include a weather forecasting database, allowing a simulation to query real-world data as it becomes available, or allowing for the pre-loading of such data, or data from a web page or other web service, and developing a model to simulate without taking further real-world data in as the simulation runs.

Figure 2:
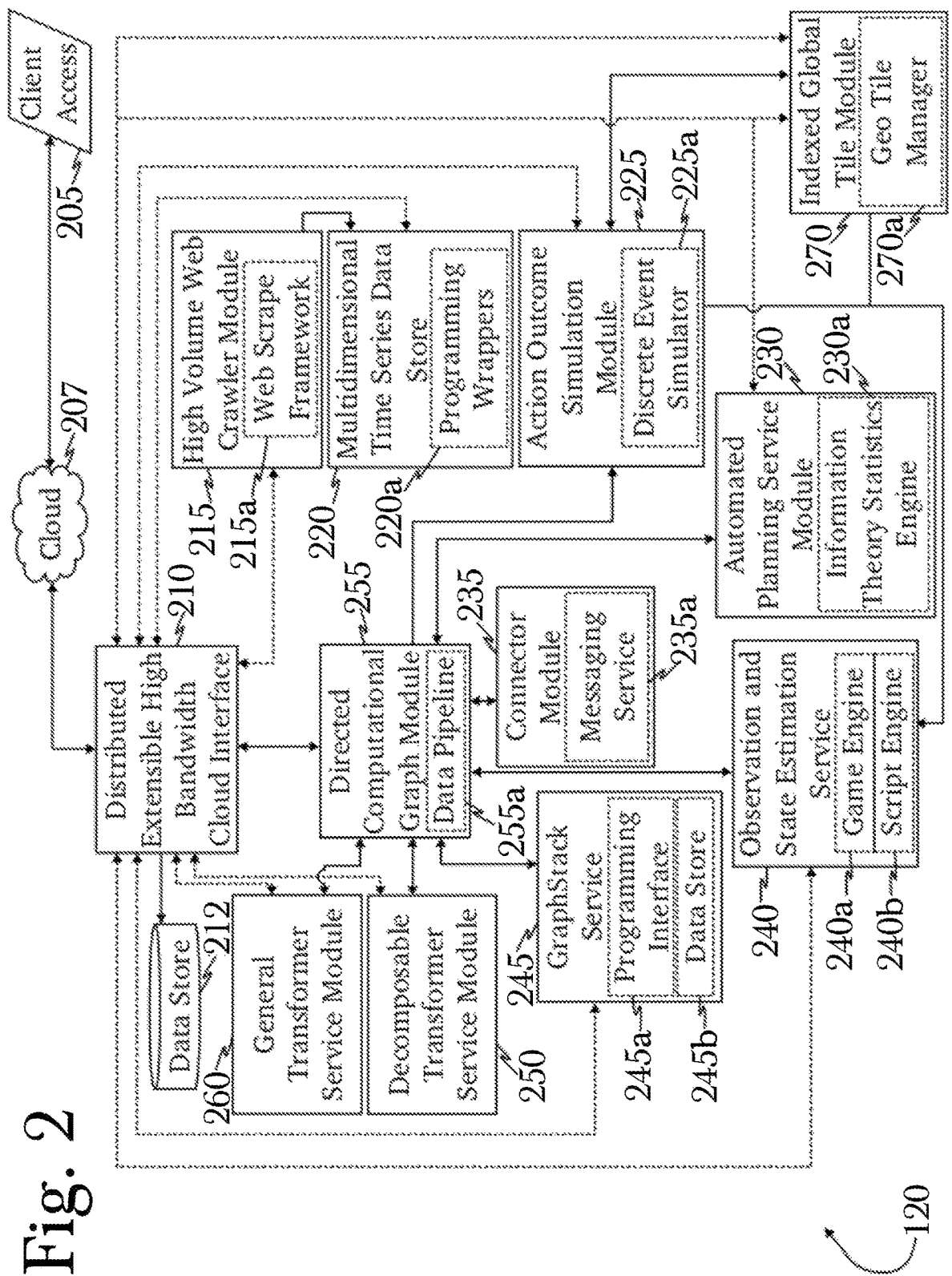
FIG. 2 is a diagram of an exemplary architecture of a data analysis system according to an embodiment of the invention.

FIG. 2 is a diagram of an exemplary architecture of a data analysis system 120 according to an embodiment of the invention. Client access to system 205 for specific data entry, system control and for interaction with system output such as automated predictive decision making and planning and alternate pathway simulations, occurs through the system's distributed, extensible high bandwidth cloud interface 210 which uses a versatile, robust web application driven interface for both input and display of client-facing information and a data store 212 such as, but not limited to MONGODB™, COUCHDB™, CASSANDRA™ or REDIS™ depending on the embodiment. Much of the business data analyzed by the system both from sources within the confines of the client business, and from cloud based sources 207, public or proprietary such as, but not limited to: subscribed business field specific data services, external remote sensors, subscribed satellite image and data feeds and web sites of interest to business operations both general and field specific, also enter the system through the cloud interface 210, data being passed to the connector module 235 which may possess the API routines 235*a* needed to accept and convert the external data and then pass the normalized information to other analysis and transformation components of the system, the directed computational graph module 255, high volume web crawler module 215, multidimensional time series database 220 and a graph stack service 245. Directed computational graph module 255 retrieves one or more streams of data from a plurality of sources, which includes, but is not limited to, a plurality of physical sensors, network service providers, web-based questionnaires and surveys, monitoring of electronic infrastructure, crowd sourcing campaigns, and human input device information. Within directed computational graph module 255, data may be split into two identical streams in a specialized pre-programmed data pipeline 255*a*, wherein one sub-stream may be sent for batch processing and storage while the other sub-stream may be reformatted for transformation pipeline analysis. The data may be then transferred to a general transformer service module 260 for linear data transformation as part of analysis or the decomposable transformer service module 250 for branching or iterative transformations that are part of analysis. Directed computational graph module 255 represents all data as directed graphs where the transformations are nodes and the result messages between transformations edges of the graph. High-volume web crawling module 215 may use multiple server hosted preprogrammed web spiders which, while autonomously configured, may be deployed within a web scraping framework 215*a* of which SCRAPY™ is an example, to identify and retrieve data of interest from web-based sources that are not well tagged by conventional web crawling technology. Multiple dimension time series data store module 220 may receive streaming data from a large plurality of sensors that may be of several different types. Multiple dimension time series data store module 220 may also store any time series data encountered by system 120 such as, but not limited to, environmental factors at insured client infrastructure sites, component sensor readings and system logs of some or all insured client equipment, weather and catastrophic event reports for regions an insured client occupies, political communiques and/or news from regions hosting insured client infrastructure and network service information captures (such as, but not limited to, news, capital funding opportunities and financial feeds, and sales, market condition), and service related customer data. Multiple dimension time series data store module 220 may accommodate irregular and high-volume surges by dynamically allotting network bandwidth and server processing channels to process the incoming data. Inclusion of programming wrappers 220*a* for languages—examples of which may include, but are not limited to, C++, PERL, PYTHON, and ERLANG™—allows sophisticated programming logic to be added to default functions of multidimensional time series database 220 without intimate knowledge of the core programming, greatly extending breadth of function. Data retrieved by multidimensional time series database 220 and high-volume web crawling module 215 may be further analyzed and transformed into task-optimized results by directed computational graph 255 and associated general transformer service 260 and decomposable transformer service 250 modules. Alternately, data from the multidimensional time series database and high-volume web crawling modules may be sent, often with scripted cuing information determining important vertices 245*a*, to graph stack service module 245 which, employing standardized protocols for converting streams of information into graph representations of that data, for example open graph internet technology (although the invention is not reliant on any one standard). Through the steps, graph stack service module 245 represents data in graphical form influenced by any pre-determined scripted modifications 245*a* and stores it in a graph-based data store 245*b* such as GIRAPH™ or a key-value pair type data store REDIS™, or RIAK™, among others, any of which are suitable for storing graph-based information.

Results of the transformative analysis process may then be combined with further client directives, additional business rules and practices relevant to the analysis and situational information external to the data already available in automated planning service module 230, which also runs powerful information theory-based predictive statistics functions and machine learning algorithms 230*a* to allow future trends and outcomes to be rapidly forecast based upon the current system derived results and choosing each a plurality of possible business decisions. Then, using all or most available data, automated planning service module 230 may propose business decisions most likely to result in favorable business outcomes with a usably high level of certainty. Closely related to the automated planning service module 230 in the use of system-derived results in conjunction with possible externally supplied additional information in the assistance of end user business decision making, action outcome simulation module 225 with a discrete event simulator programming module 225a coupled with an end user-facing observation and state estimation service 240, which is highly scriptable 240b as circumstances require and has a game engine 240a to more realistically stage possible outcomes of business decisions under consideration, allows business decision makers to investigate the probable outcomes of choosing one pending course of action over another based upon analysis of the current available data.

A significant proportion of the data that is retrieved and transformed by the data analysis system 120, both in real world analyses and as predictive simulations that build upon intelligent extrapolations of real-world data, may include a geospatial component. The indexed global tile module 270 and its associated geo tile manager 270a may manage externally available, standardized geospatial tiles and may enable other components of the data analysis system 120, through programming methods, to access and manipulate meta-information associated with geospatial tiles and stored by the system. The data analysis system 120 may manipulate this component over the time frame of an analysis and potentially beyond such that, in addition to other discriminators, the data is also tagged, or indexed, with their coordinates of origin on the globe. This may allow the system to better integrate and store analysis specific information with all available information within the same geographical region. Such ability makes possible not only another layer of transformative capability, but may greatly augment presentation of data by anchoring to geographic images including satellite imagery and superimposed maps both during presentation of real-world data and simulation runs.

Figure 3:
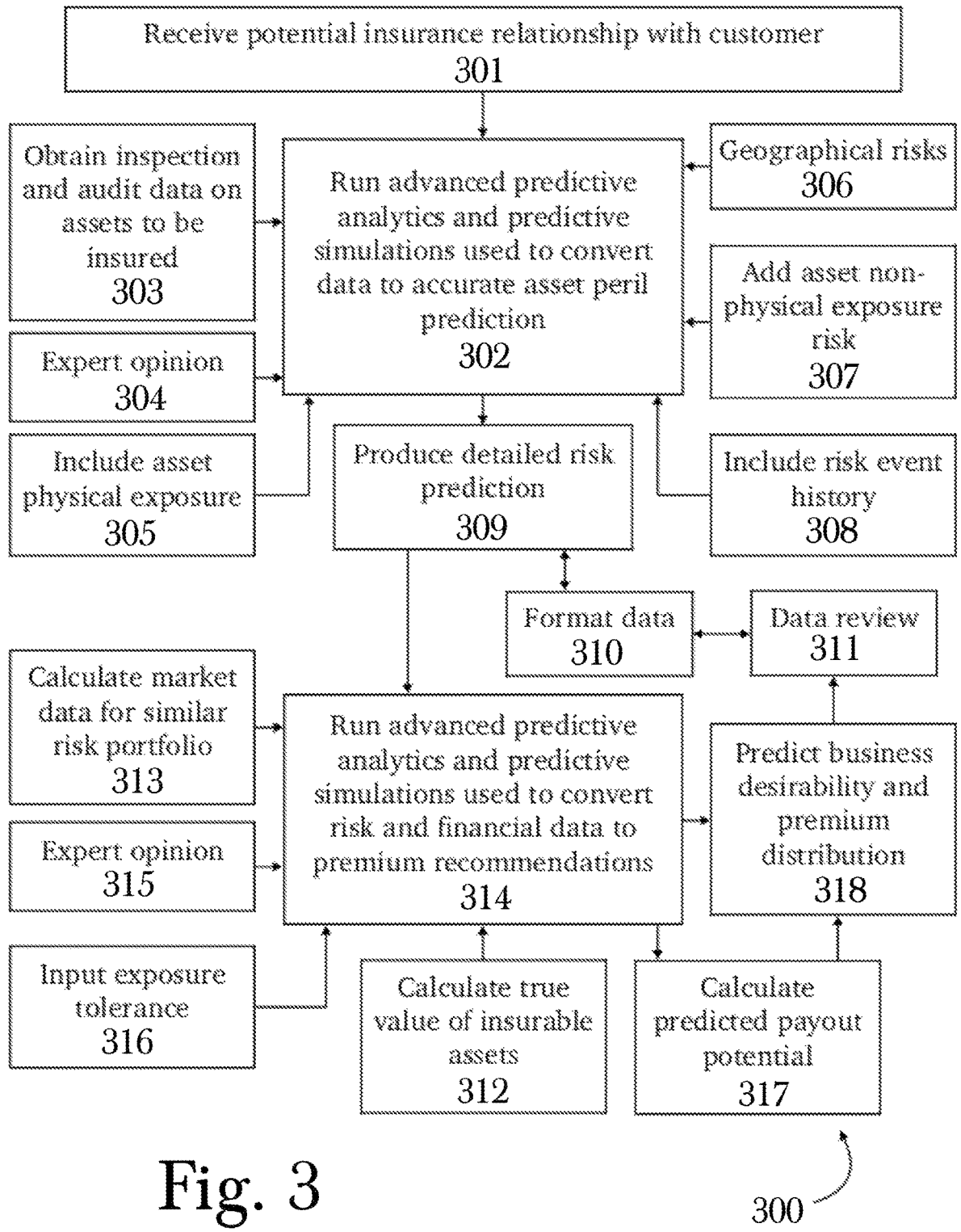
FIG. 3 is a flow diagram of an exemplary function of the data analysis system in the calculation of asset hazard and risk in relationship to premium fixation.

FIG. 3 is a flow diagram of an exemplary function 300 of the data analysis system 120 operating in a generative simulation platform 110, for the purposes of one type of simulation involving calculation of asset hazard and risk in relationship to premium fixation. In an embodiment, the prospect of a new insurance customer is presented at step 301. Several pieces of data combine to produce an insurance relationship that optimally serves both customer and insurer. All of this data must be cleanly analyzed not only individually but also as a whole, combined in multiple permutations and with the ability to uncover hard to foresee relationships and future possible pitfalls. The data analysis system 120 previously disclosed in co-pending application Ser. No. 15/141,752 and applied in a role of cybersecurity in co-pending application Ser. No. 15/237,625, when programmed to operate as an insurance decision platform, is very well suited to perform advanced predictive analytics and predictive simulations to produce risk predictions needed required by actuaries and underwriters to generate accurate tables for later pricing at step 302. Data forming the basis of these calculations may be drawn from a set comprising at least: inspection and audit data on the condition and worth of the customer's equipment and infrastructure to be insured at step 303; known and probable physical risks to customer's assets such as but not limited to: flooding, volcanic eruption, wildfires, tornado activity, hurricane or typhoon, earthquake among other similar dangers known to those skilled in the art at step 305; non-physical risks to customer's assets which may include, but are not limited to: electronic or cyberattack, and business interruption from defective operating software as well as other similar risks known to those skilled in the field at step 307; and geographical risks, which may include but are not limited to: political and economic unrest, crime rates, government actions, and escalation of regional tensions at step 306. Also of great importance may be the actual history of risk events at step 308 occurring at or near the sites of a customer's assets as such data provides at least some insight into the occurrence and regularity of possible payout requiring events to be analyzed prior to policy generation. For the most complete and thereby accurate use of predictive analytics and predictive simulation, the possibility to add expert opinion and experience at step 304 to the body of data should be available. Important insights into aspects of a potential client may not be present or gleaned by the analysis of the other available data. An observation made by an insurer's expert during the process, even if seemingly minor, may, when analyzed with other available data, give rise to additional queries that must be pursued or significantly change the predictive risk recommendations produced at step 309 by the insurance decision platform during step 302.

The generation of detailed risk prediction data during step 309, which may have granularity to every unit of equipment possessed and each structure as well as support land and services of each area of infrastructure as would be known to those skilled in the field, is of great value on its own and its display at step 311, possibly in several presentation formats prepared at step 310 for different insurer groups may be needed, for example as a strong basis for the work of actuaries and underwriters to derive risk cost tables and guides, among multiple other groups who may be known to those skilled in the field. Once expert risk-cost data is determined, it may be input at step 311, system formatted and cleaned at step 310 and added to the system generated risk prediction data, along with contributions by other insurer employed groups to the data to be used in predictive calculation of business desirability of insuring the new venture, current insured portfolio risk accumulation, and premium recommendations in steps 314 and 318. Some factors that may be retrieved and employed by the system here are: to gather available market data for similar risk portfolios as pricing and insurer financial impact guidelines at step 313; all available data for all equipment and infrastructure to be insured may also be reanalyzed for accuracy, especially for replacement values which may fluctuate greatly and need to be adjusted intelligently to reflect that at step 312; the probabilities of multiple disaster payouts or cascading payouts between linked sites as well as other rare events or very rare events must be either predicted or explored and accounted for at step 317; an honest assessment of insurer carrier risk exposure tolerance as it is related to the possible customer's specific variables must be considered for intelligent predictive recommendations to be made at step 316; also potential payout capital sources for the new venture must be investigated be they traditional in nature or alternative such as, but not limited to insurance linked security funds at step 319; again, the possibility of expert opinion data should be available to the system at step 315 during analysis and prediction of business desirability recommendations and premiums changed at step 318. All recommendations may be formatted at step 310 for specific groups within the insurer company and possibly portions for the perspective client and displayed for review at step 311.

While all descriptions above present use of the insurance decision platform for new clients, the majority of the above process is also applicable to such tasks as policy renewals or expansions.

Figure 4:
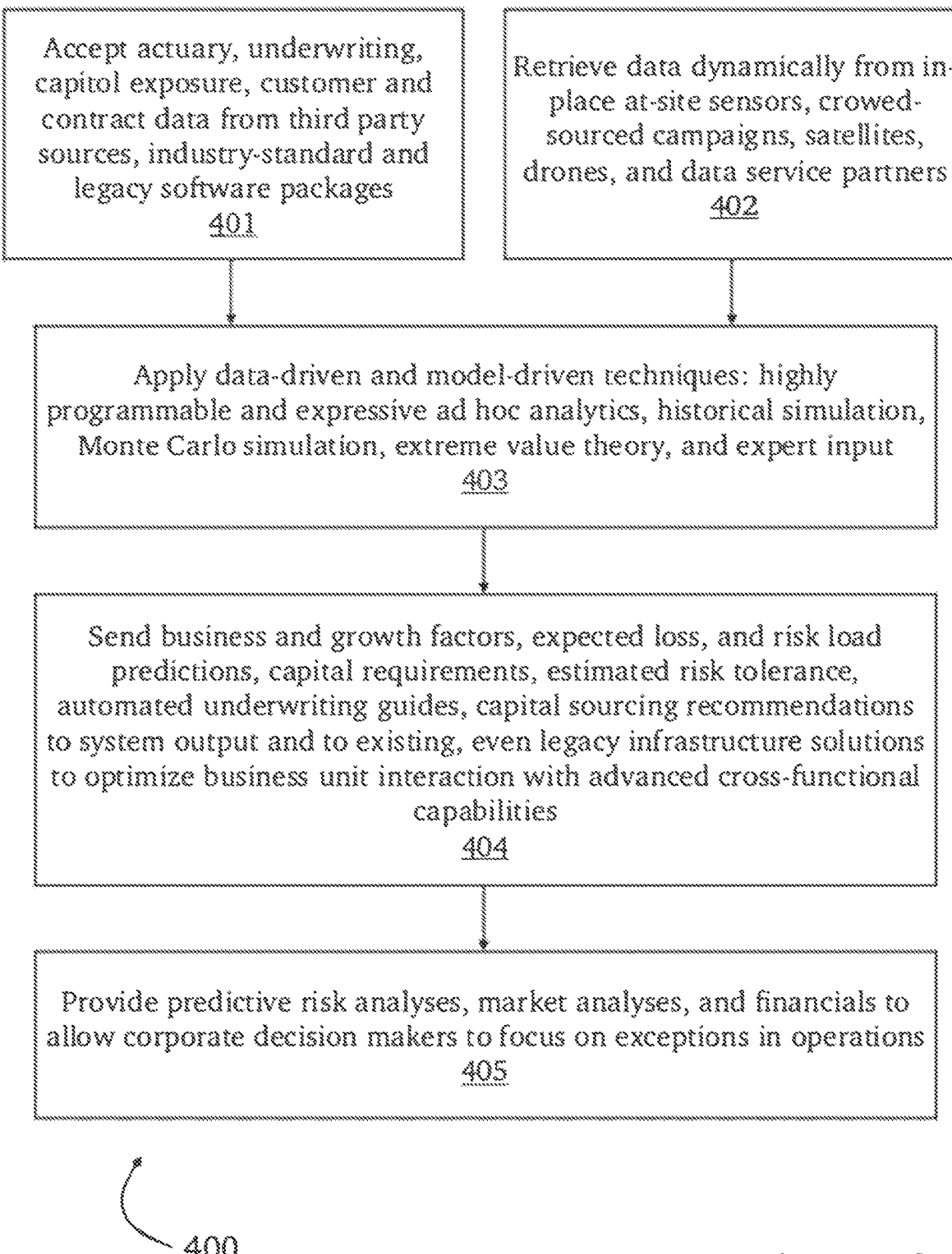
FIG. 4 is a process flow diagram of a possible role in a more generalized insurance workflow as per one embodiment of the invention.

FIG. 4 is a process flow diagram of a possible role in a more generalized insurance workflow 400 as per one embodiment of the invention. It is important that any added computational capability, such as the SaaS insurance decision platform, integrate with the majority, if not all of an insurer's existing workflow while opening the business to new sources of information and predictive capabilities. With its programmable connector module 235 and messaging center 235a, the insurance decision platform 120 is pre-designed to retrieve and transform data from the APIs of virtually all industry standard software packages and can be programmed to retrieve information from other legacy or obscure sources as needed, as an example, data may even be entered as csv and transformed, as a simplistic choice from the many possible formats known to one skilled in the art and for which the platform is capable to handle at step 401. Of greatly added value, the platform may allow the client insurer to receive data dynamically from in-place at site sensors at insurance client sites or in various areas of interest at step 402 due to the multidimensional time series 220 data store which can be programmed to interpret and correctly normalize many data streams 220a. Feeds from crowd sourced campaigns, satellites, drones, sources which may not have been available to the insurer client in the past can also be used as information sources as can a plurality of insurance related data, both on the general web and from data service providers may also add to the full complement of data the insurer client can use for decision making. To reliably and usefully process all of this data which can quickly overwhelm even a team dedicated to accumulation and cleansing, the platform may transform and analyze the data with model and data driven algorithms which include but are not limited to ad hoc analytics, historical simulation, Monte Carlo simulation, extreme value theory and processes augmented by insurance expert input at step 403 as well as other techniques known to be useful in these circumstances by those knowledgeable in the art, for which the platform is highly, expressively programmable. The output of system generated analyses and simulations such as estimated risk tolerances, underwriting guides, capital sourcing recommendations among many others known to those knowledgeable in the art may then be sent directly to dedicated displays or formatted by the connector module 235 and distributed to existing or existing legacy infrastructure solutions to optimize business unit interaction with new, advanced cross functional decision recommendations at step 404. The end result is that decision makers can focus on creative production and exception-based event management rather than simplistic data collection, cleansing, and correlation tasks at step 405.

Figure 5:
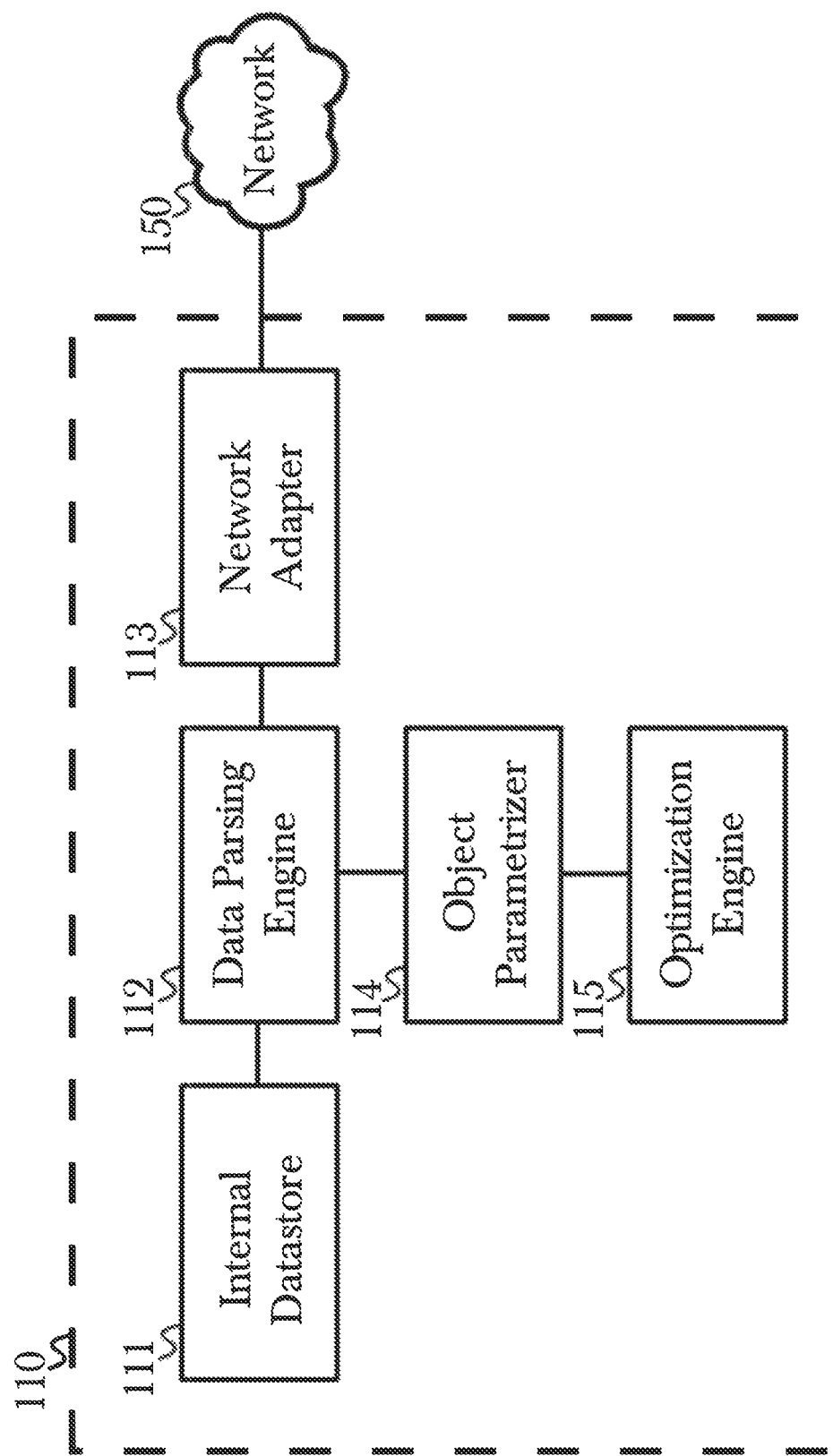
FIG. 5 is a system diagram illustrating components interior to a generative simulation platform, according to an embodiment.

FIG. 5 is a system diagram illustrating components interior to a generative simulation platform, according to an embodiment. An internal datastore 111 is present in a generative simulation platform 110, which may store data entered manually 130 or data gathered from the internet 140, which first must be gathered from a network adapter 113. A network adapter 113 connects the computer system to a network 150, which may be the internet, a local intranet, or some other network 150, and may forward data to a data parsing engine 112 which will separate desired data from "junk" or otherwise extraneous data using tools such as regular expressions and other pattern matching techniques. Examples of extraneous data include the formatting of a web page, while examples of desired data may include, for example, historical weather data in an area, if a model is being constructed for weather conditions in an area. A data parsing engine 112 then forwards data to both an internal datastore 111 to be stored for any future purposes, while data is also forwarded to an object parameterizer 114. An object parameterizer 114 takes filtered or parsed data from a data parser 112, and constructs coherent "objects" as they are known in computer software development. In this way, for example, an object could be created that represents an individual person in a model of a population of people, for a simulation of a pathogen outbreak. Data may be gathered from manual entry 130 from some tool or file written to produce data and give it to the platform 110, rather than located from an unrelated source over a network 150. An object in this context may be a "person," and may have data fields such as a binary value "infected," a string "name" if necessary, an integer "age," another integer "condition" to represent conditions such as AIDS or other conditions which may alter the individual's susceptibility to the examined pathogen, and a further included data field could include "days_in_public" to represent how often they go into public and therefore may spread the pathogen to others. In this example, as data is fed to an object parameterizer 114, many of these objects are made until no more object data is provided. Objects and un-parametrized data (if any) are then sent to an optimization engine 115, which may "freeze" certain objects or parameters of objects, or classes of objects or classes of parameters across multiple objects, from changing, during a simulation. An optimization engine 115 can also induce certain specific or deterministic changes in fields or objects during a simulation, or at the beginning of a simulation to compare with earlier simulated results, to locate key factors in altering the outcome of a simulation, which may, for example, be the state of a population's infection with a pathogen after 180 days. In this way, the system can be used to alter specific data fields and objects in a simulation from a base model, or prevent certain fields from changing during simulation runtime, to allow researchers to locate novel ways to achieve desired outcomes, for example the eradication of a pathogen from a population after 180 days. Researchers can also focus further experiments and simulations on results that were closer to a desired goal, for example if changing a few key variables resulted in significantly lower infection rates in a population than before, they may now direct their research to those variables.

Figure 6:
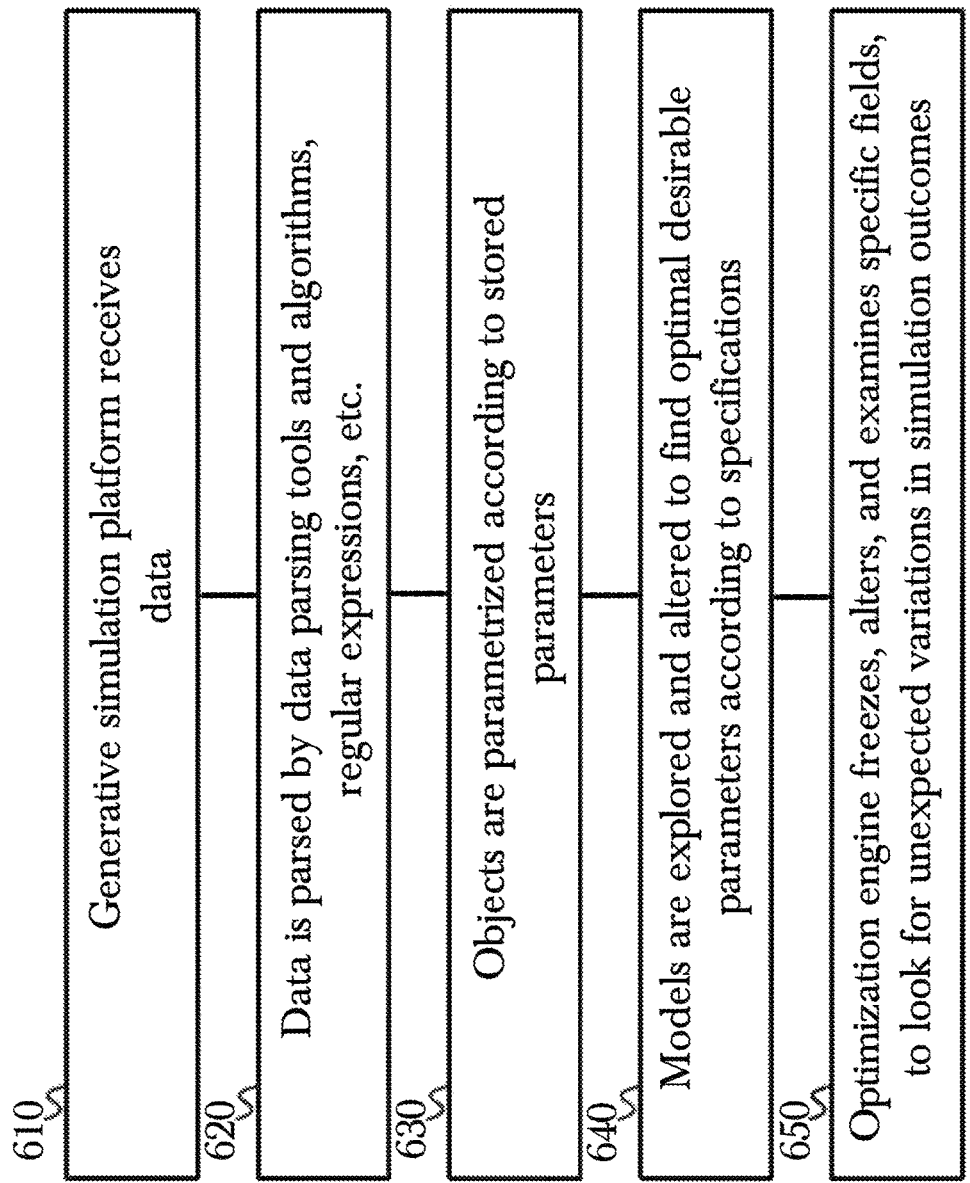
FIG. 6 is a method diagram illustrating high level steps in the operation of a multi-model generative simulation system, according to a preferred aspect.

FIG. 6 is a method diagram illustrating high level steps in the operation of a multi-model generative simulation system, according to a preferred aspect. First, a platform 110 must receive data 610, which may be accomplished manually 130 or through network-available data 140 which may not be specifically prepared for the system, but is nonetheless available to be used, via a network adapter 113. Data may then be parsed 620 using a data parsing engine 112, which may utilize common tools such as regular expressions and string queries such as LINQ™, to find desired data amidst whatever data may be supplied, which may either be hand-picked manually 130 or retrieved automatically from a network resource 140 such as an internet-enabled website or other webservice. Once data is parsed 620, objects are parametrized 630 according to whatever stored parameters are contained in internal storage 111, utilizing an object parameterizer 114. An object parameterizer 114 acting in this way may, as discussed above in FIG. 5, create "objects" for a model to be simulated, such as individual people, or even corporations and stocks if utilizing the system for financial simulations and risk assessment. Objects may be instantiated and parametrized 630 for a simulation model, before simulations are run using the established models and explored to find optimal parameters according to specifications 640 which may include, for example, ending a simulation of pathogen spread and eradication if the population infection rate reaches 30%, or 0%, indicating either widespread infection or total eradication of the virus. Another possible simulation and outcome parameter may be risk assessment of financial actors, to examine the risk of a market given certain parameters and environmental data to be parametrized 630, and the simulation specified to end if risk assessment reaches a certain threshold, whether low or high, to find low-risk strategies and avoid high-risk ones. An optimization engine 115 may be used to perform optimization functions on a running simulation 650 by "freezing" or otherwise preventing certain parameters or objects from being changed, or artificially changing certain parameters or objects ex nihilo so as to see the reaction of the simulated model to unexpected or unpredicted changes. In this way, unknown changes or unpredictable changes can be simulated, as well as attempts to isolate parameters, in an effort to find alternative methods to bring about a desirable outcome, thereby helping direct future experiments.

Figure 7:
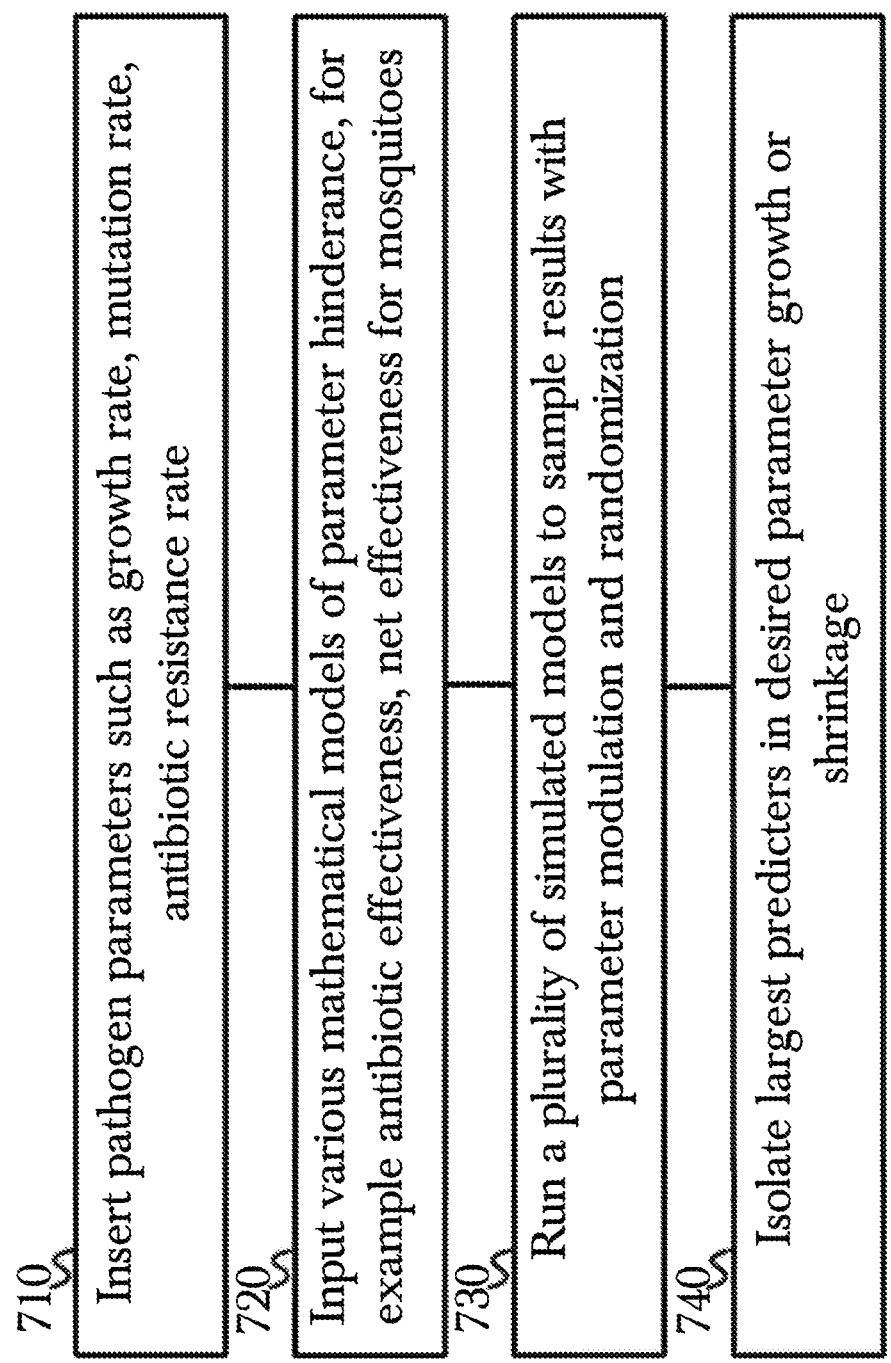
FIG. 7 is a method diagram illustrating an exemplary use of a multi-model generative simulation system to model and track variable changes in pathogen spreading and eradication rates.

FIG. 7 is a method diagram illustrating an exemplary use of a multi-model, peril agnostic generative simulation system to model and track variable changes in pathogen spreading and eradication rates. In this exemplary method, pathogen parameters may be inserted into a model manually 710, 130, or via online data 140, including mutation rates, resistance to general or specific antibiotics, growth rate, the rate of spreading, and more as needed, to accurately model a specific pathogen. Data about hinderance of the pathogen regarding various methods including nets for mosquitoes, or antibiotic effectiveness, or population hygiene rates and habits can then be input 720, further allowing for precision regarding a simulation of the spread or eradication of a given pathogen. A plurality of simulations may be run with the base model in place, to sample numerous different techniques of controlling a pathogen, different outbreak patterns, and more 730, while samples from a population in such a simulation can be taken and parameters frozen or altered so as to attempt to isolate the largest drivers of contamination or pathogen control 740. This may be accomplished with an optimization engine 115. In this way, an examination of differing policies and techniques to control outbreaks may take place, allowing for more directed research in the future.

Figure 8:
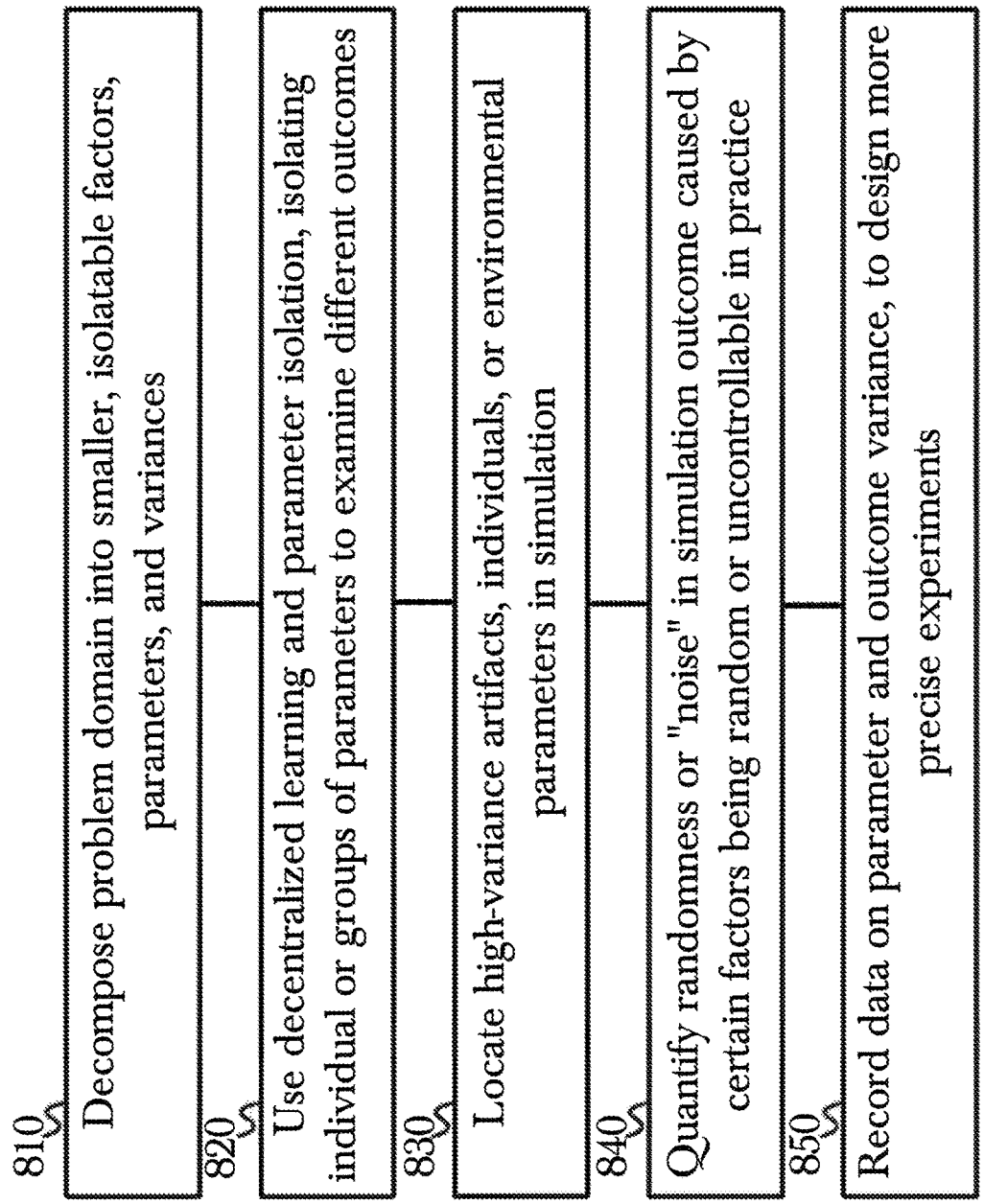
FIG. 8 is a method diagram illustrating an exemplary use of a multi-model generative simulation system to decompose complex problems and freeze specific parameters of objects and actors in a simulation, for complex simulations including engineering problems regarding for example fluid dynamics.

FIG. 8 is a method diagram illustrating an exemplary use of a multi-model generative simulation system to decompose complex problems and freeze specific parameters of objects and actors in a simulation, for complex simulations including engineering problems regarding for example fluid dynamics. A problem may be decomposed into small units 810, for example separating a two-step process or a complex math equation into multiple parts, where each can be an isolated factor in a simulation that can be altered or affected during runtime. Decentralized learning can be applied to different areas of a simulation runtime, isolating groups of objects or "actors" in a simulation runtime, or groups of parameters, and evaluating their behaviors as separate groups 820, before analyzing their relationship to the larger whole of the simulation. High-variance artifacts, objects, agents, or environmental factors in a simulation should be located 830, such as for example the presence of a compromised immune system in an individual in a pathogen simulation, so that the factor can be isolated from the rest of the factors affecting the population. Randomness or "noise" generated in a simulation may be accounted for depending on the settings present during model construction 840, and may be accounted for when isolating parameters or groups of parameters or objects, such that if ex nihilo factors are the primary cause of variance, the results can still be useful to researchers for future experiments or attempts at bringing about a specific outcome. For example, if only external factors which cannot be accounted for are seen to be influencing the contamination rate of a population, e.g. carrier individuals arriving from out of the original contamination zone, then it can at least be determined that the cause of increased or continual contamination is not interior to the population, and efforts including future simulations and attempts at controlling an outbreak can be directed at this external factor, making it an internal one in future simulations which can be run with more precision 850. Such factors can be accounted for and represented through an optimization engine 115 which may freeze or alter parameters or objects capriciously, representing these unforeseen or random events, even in some cases appearing to be useless alterations, but in other cases being an alteration that can represent a previously unaccounted for occurrence in the simulation.

Figure 9:
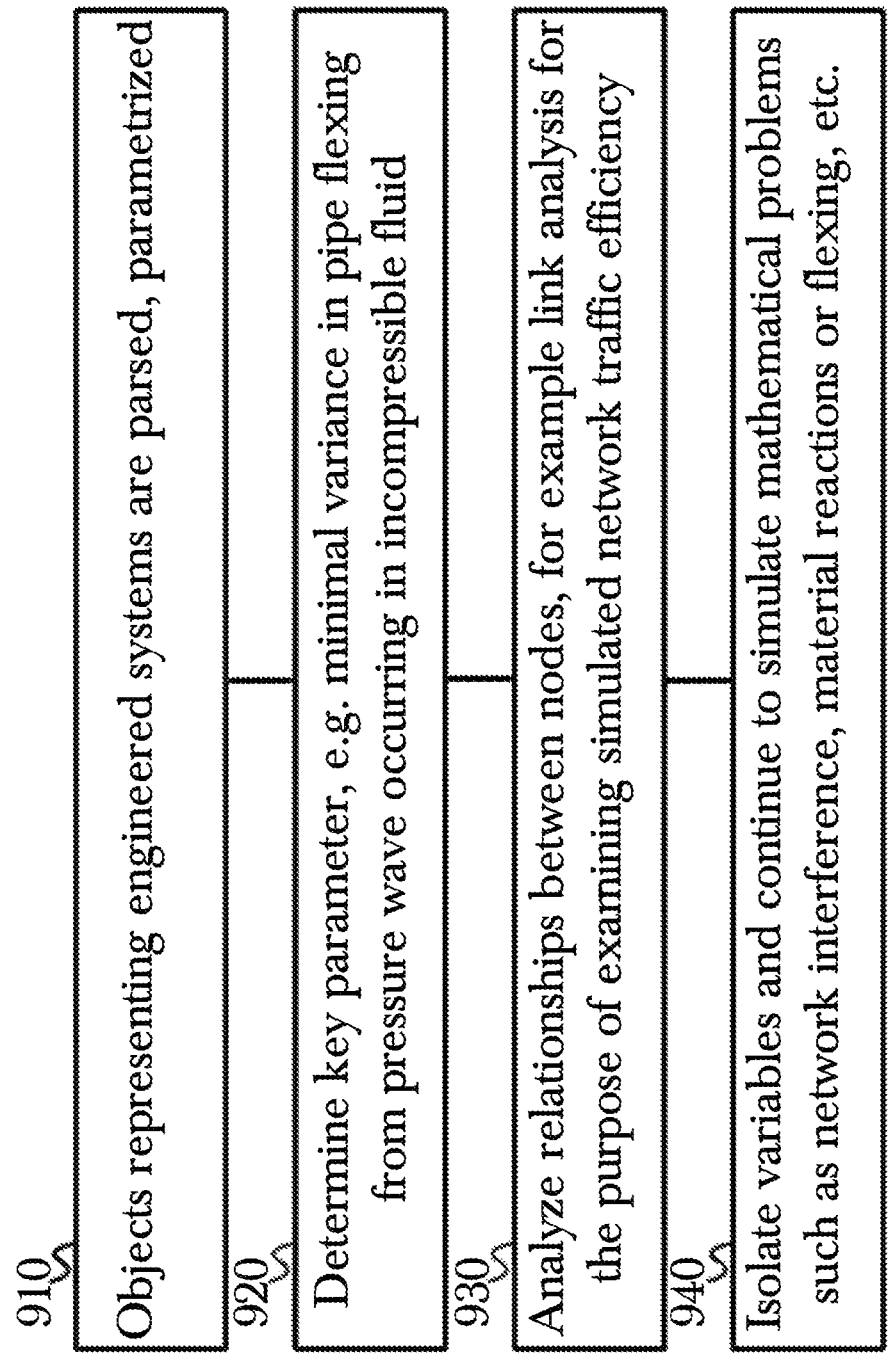
FIG. 9 is a method diagram illustrating an exemplary use of a multi-model generative simulation system to model and track nodular or list-based systems, such as networking traffic.

FIG. 9 is a method diagram illustrating an exemplary use of a multi-model generative simulation system to model and track nodular or list-based systems, such as networking traffic. Objects representing engineered systems or objects may be parametrized 910, such as a pipe with an incompressible fluid, or a network cable with a specified throughput and specific physical characteristics that may be important for developing new ways to increase throughput in a given material. A key parameter may be identified as having the largest effect on the result of the simulation, for example the compressibility of a fluid when simulating a pressure wave in a fluid-filled tube 920, and may be altered or watched for alterations during simulation specifically. Relationships between nodes in a model may then be analyzed, for example in a network simulation or some other nodular model 930, where network efficiency can be examined. Field or object isolation may then be accomplished to examine the effects of an individual field being altered 940, using an optimization engine 115.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit ("ASIC"), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
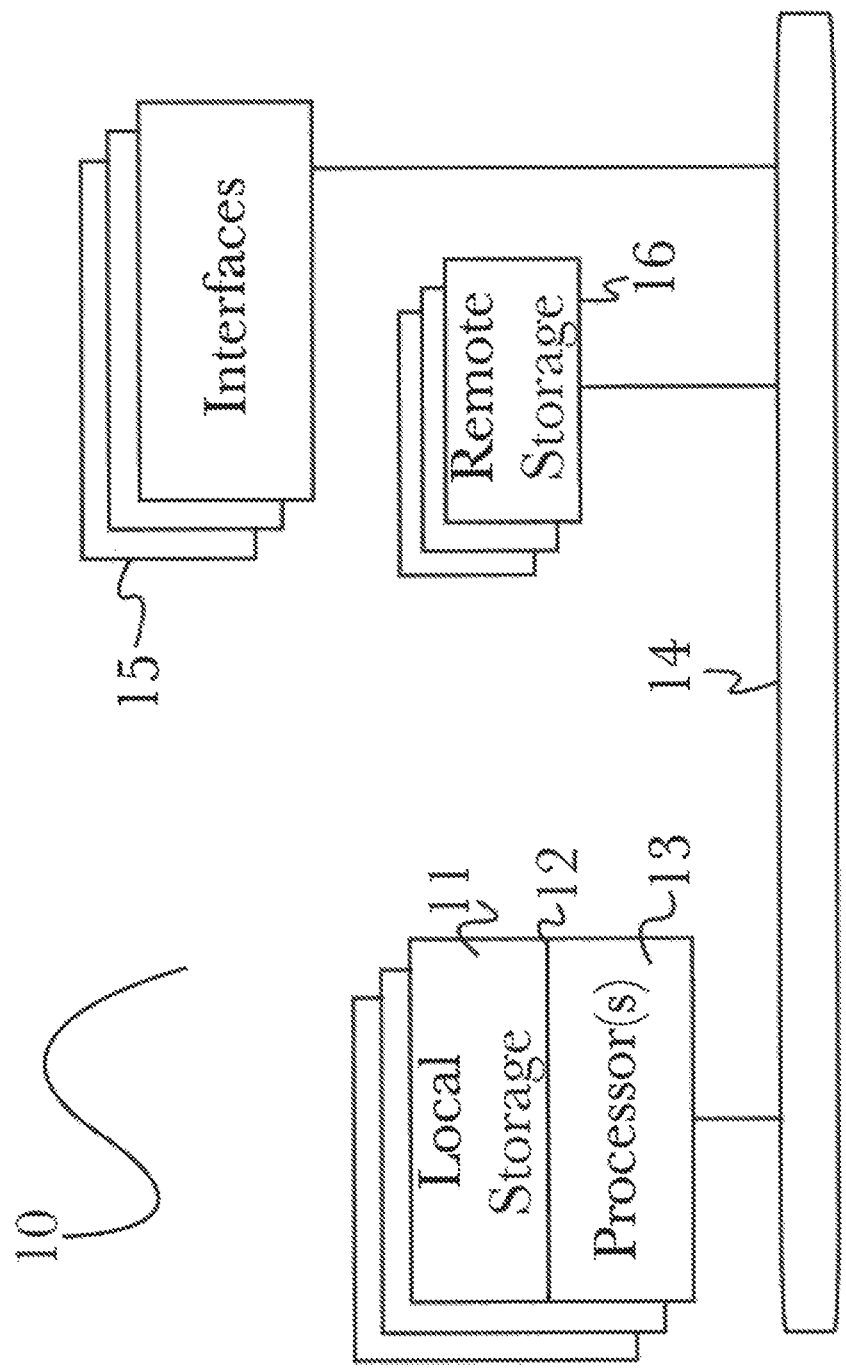
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
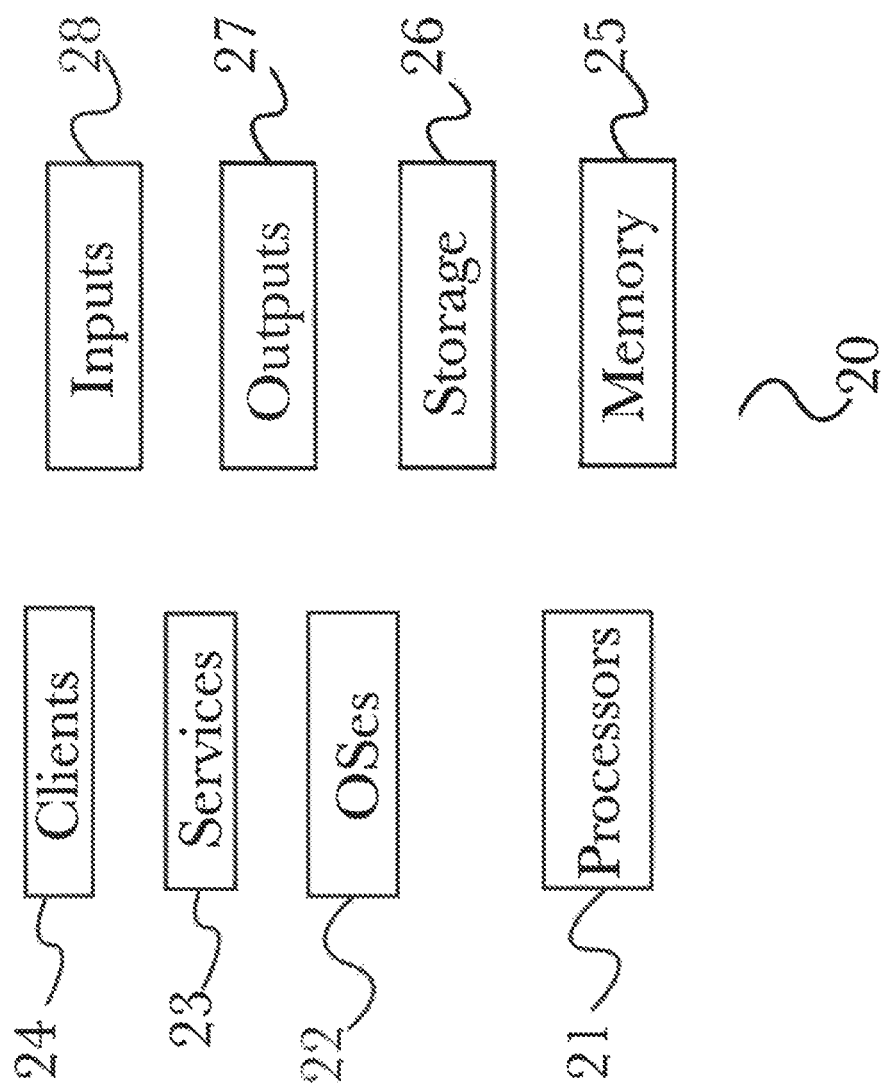
FIG. 11 is a block diagram illustrating an exemplary logical architecture for a client device.

In some embodiments, systems according to the present invention may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
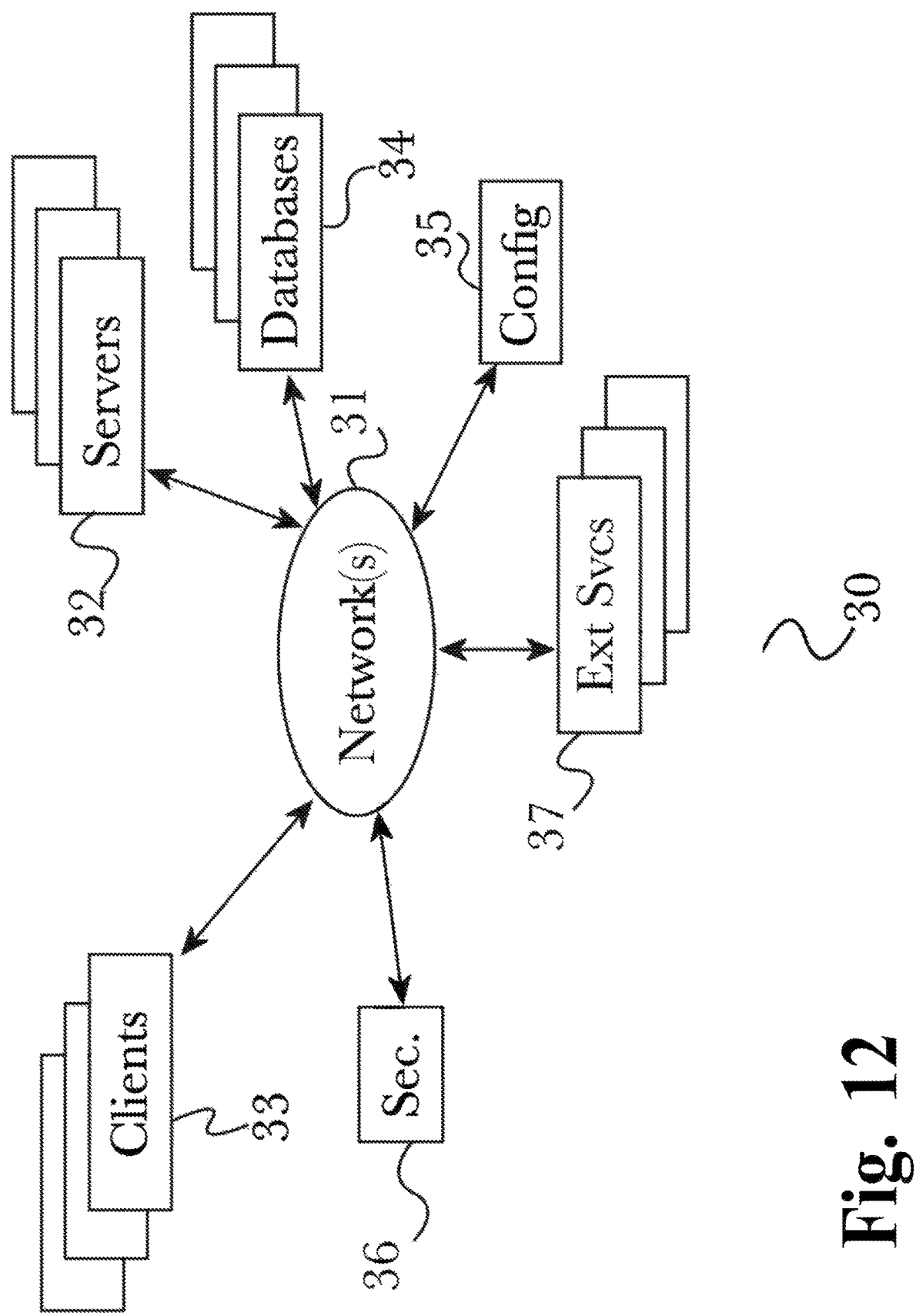
FIG. 12 is a block diagram showing an exemplary architectural arrangement of clients, servers, and external services.

In some embodiments, systems of the present invention may be implemented on a distributed computing network, such as one having any number of clients and/or servers. Referring now to FIG. 12, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 13:
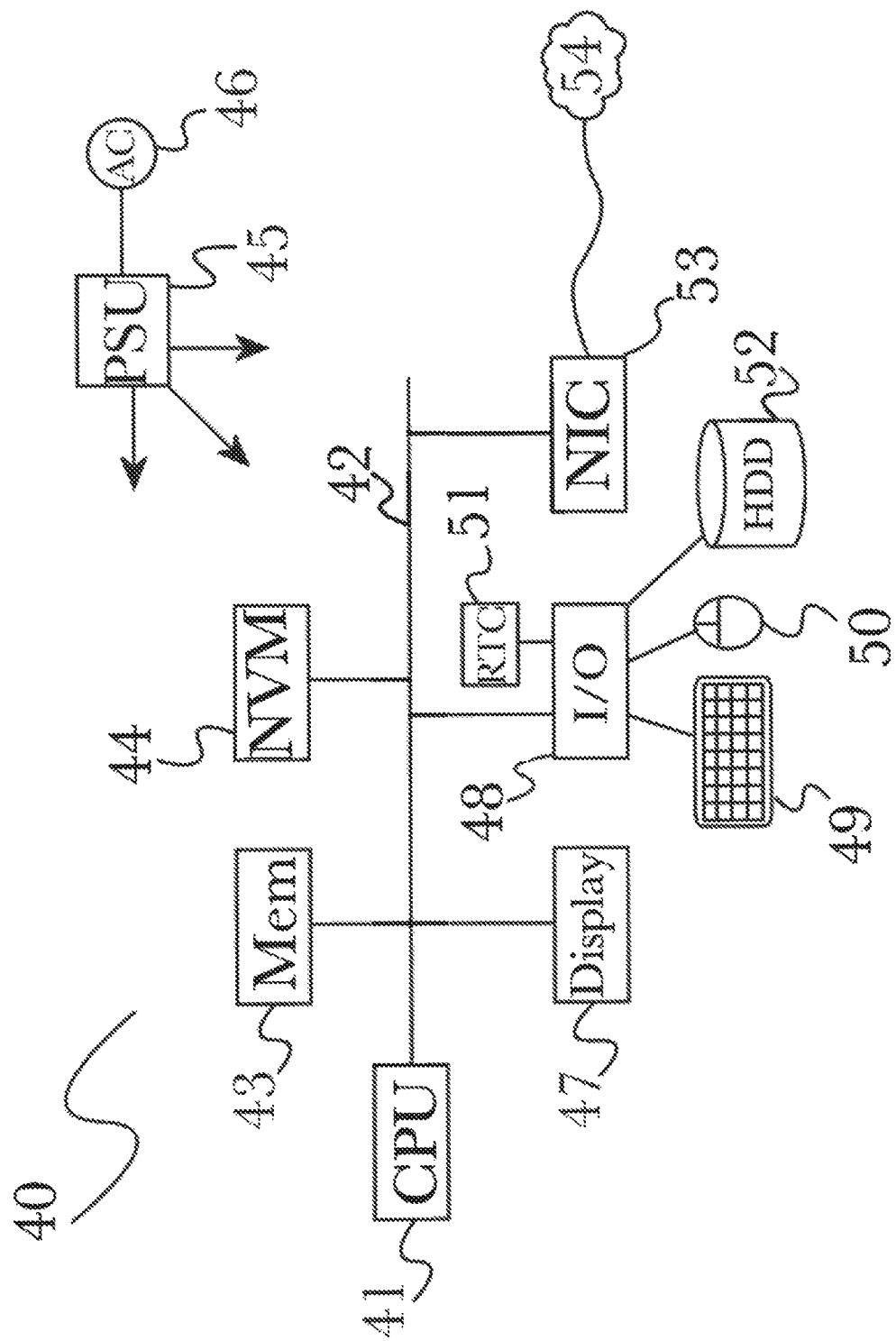
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A computing system for multi-model generative simulation modeling of complex adaptive systems employing generative simulation platform, the computing system comprising:
one or more hardware processors configured for:
receiving some combination of object, environment, or simulation data from a resource over a network;
receiving a plurality of perils for analysis;
parsing the received combination of data using pattern recognition;
parameterizing the parsed data into objects for model building;
creating and running a first model for analysis of the plurality of perils from the objects for model building to generate a first set of synthetically generated data;
creating and running a second model for analysis of the plurality of perils by altering parameters of the first model to simulate random or unknown events occurring to generate a second set of synthetically generated data;
creating and running a third model for analysis of the plurality of perils from the first model, the third model having isolated groups of the objects for model building, to generate a third set of synthetically generated data;
creating a fourth data set using analyzed data based at least in part on the plurality of perils;
creating a fifth data set by:
retrieving the first, second, and third sets of synthetically generated data based at least on the plurality of perils; and
analyzing the relationships of the second and third sets of synthetically generated data against the first set of synthetically generated data;
comparatively analyzing the fourth data set against the fifth data set to determine an optimal model to use for predictive simulation of the plurality of perils;
receiving a data processing workflow in the form of a graph comprising nodes representing data transformations and edges representing messages passed between the nodes;
retrieving the first, second, and third models for evaluation according to the data processing workflow of the graph;
instantiating a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems;
performing an initial execution of each of the first, second, and third models using the instantiated plurality of data processing pipelines on the distributed computing network using a set of initial parameters to obtain a model result for each of the first, second, and third models; and
determining an epistemic uncertainty value of the first model by comparing the model result of the first model with the model results of the second and third models.

2. The computing system of claim 1, wherein the generative simulation platform is used to simulate pathogen behavior and pathogen control methods.

3. The computing system of claim 1, wherein tasks, equations, and object groups may be decomposed into smaller tasks, equations, and groups for management.

4. The computing system of claim 1, wherein the generative simulation platform simulates an engineering task including a network engineering simulation.

5. The computing system of claim 1, wherein the generative simulation platform simulates complex events for purposes of pricing insurance and risk transfer.

6. The computing system of claim 1, wherein the one or more hardware processors are further configured for:

performing parametric evaluation of the first model by iterating it over a range of values for one parameter of the set of initial parameters of the first model to determine the first model's sensitivity to changes in the one parameter using the instantiated plurality of data processing pipelines on the plurality of computer systems;

changing the one parameter of the first model to reduce the epistemic uncertainty based on the first model's sensitivity to the one parameter; and repeating the parametric evaluation, comparison, and model changes until the determined epistemic uncertainty value for the first model falls below a predetermined threshold.

7. A computer-implemented method executed on a generative simulation platform for multi-model generative simulation modeling of complex adaptive systems, the computer-implemented method comprising:

receiving some combination of object, environment, or simulation data from a resource over a network;

receiving a plurality of perils for analysis;

parsing the received combination of data using pattern recognition;

parameterizing the parsed data into objects for model building;

creating and running a first model for analysis of the plurality of perils from the objects for model building to generate a first set of synthetically generated data;

creating and running a second model for analysis of the plurality of perils by altering parameters of the first model to simulate random or unknown events occurring to generate a second set of synthetically generated data;

creating and running a third model for analysis of the plurality of perils from the first model, the third model having isolated groups of the objects for model building, to generate a third set of synthetically generated data;

creating a fourth data set using analyzed data based at least in part on the plurality of perils;

creating a fifth data set by:
retrieving the first, second, and third sets of synthetically generated data based at least on the plurality of perils; and
analyzing the relationships of the second and third sets of synthetically generated data against the first set of synthetically generated data;

comparatively analyzing the fourth data set against the fifth data set to determine an optimal model to use for predictive simulation of the plurality of perils;

receiving a data processing workflow in the form of a graph comprising nodes representing data transformations and edges representing messages passed between the nodes;

retrieving the first, second, and third models for evaluation according to the data processing workflow of the graph;

instantiating a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems;

performing an initial execution of each of the first, second, and third models using the instantiated plurality of data processing pipelines on the distributed computing network using a set of initial parameters to obtain a model result for each of the first, second, and third models; and determining an epistemic uncertainty value of the first model by comparing the model result of the first model with the model results of the second and third models.

8. The computer-implemented method of claim 7, wherein the generative simulation platform is used to simulate pathogen behavior and pathogen control methods.

9. The computer-implemented method of claim 7 wherein tasks, equations, and object groups may be decomposed into smaller tasks, equations, and groups for management.

10. The computer-implemented method of claim 7, wherein the generative simulation platform simulates an engineering task including a network engineering simulation.

11. The computer-implemented method of claim 7, wherein the generative simulation platform simulates complex events for purposes of pricing insurance and risk transfer.

12. The computer-implemented method of claim 7 further comprising:

performing parametric evaluation of the first model by iterating it over a range of values for one parameter of the set of initial parameters of the first model to determine the first model's sensitivity to changes in the one parameter using the instantiated plurality of data processing pipelines on the plurality of computer systems;

changing the one parameter of the first model to reduce the epistemic uncertainty based on the first model's sensitivity to the one parameter; and repeating the parametric evaluation, comparison, and model changes until the determined epistemic uncertainty value for the first model falls below a predetermined threshold.

13. A system for multi-model generative simulation modeling of complex adaptive systems employing a generative simulation platform, comprising one or more computers with executable instructions that, when executed, cause the system to:

receive some combination of object, environment, or simulation data from a resource over a network;

receive a plurality of perils for analysis;

parse the received combination of data using pattern recognition;

parameterize the parsed data into objects for model building;

create and run a first model for analysis of the plurality of perils from the objects for model building to generate a first set of synthetically generated data;

create and run a second model for analysis of the plurality of perils by altering parameters of the first model to simulate random or unknown events occurring to generate a second set of synthetically generated data;

create and run a third model for analysis of the plurality of perils from the first model, the third model having isolated groups of the objects for model building, to generate a third set of synthetically generated data;

create a fourth data set using analyzed data based at least in part on the plurality of perils;

create a fifth data set by:
retrieving the first, second, and third sets of synthetically generated data based at least on the plurality of perils; and analyzing the relationships of the second and third sets of synthetically generated data against the first set of synthetically generated data;
comparatively analyze the fourth data set against the fifth data set to determine an optimal model to use for predictive simulation of the plurality of perils;
receive a data processing workflow in the form of a graph comprising nodes representing data transformations and edges representing messages passed between the nodes;
retrieve the first, second, and third models for evaluation according to the data processing workflow of the graph;
instantiate a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems;
perform an initial execution of each of the first, second, and third models using the instantiated plurality of data processing pipelines on the distributed computing network using a set of initial parameters to obtain a model result for each of the first, second, and third models; and
determine an epistemic uncertainty value of the first model by comparing the model result of the first model with the model results of the second and third models.

14. The system of claim 13, wherein the generative simulation platform is used to simulate pathogen behavior and pathogen control methods.

15. The system of claim 13, wherein tasks, equations, and object groups may be decomposed into smaller tasks, equations, and groups for management.

16. The system of claim 13, wherein the generative simulation platform simulates an engineering task including a network engineering simulation.

17. The system of claim 13, wherein the generative simulation platform simulates complex events for purposes of pricing insurance and risk transfer.

18. The system of claim 13, wherein the system is further caused to:
perform parametric evaluation of the first model by iterating it over a range of values for one parameter of the set of initial parameters of the first model to determine the first model's sensitivity to changes in the one parameter using the instantiated plurality of data processing pipelines on the plurality of computer systems;
change the one parameter of the first model to reduce the epistemic uncertainty based on the first model's sensitivity to the one parameter; and
repeat the parametric evaluation, comparison, and model changes until the determined epistemic uncertainty value for the first model falls below a pre-determined threshold.

19. Non-transitory, computer-readable storage media having computer-executable instructions embodied thereon that, when executed by one or more processors of a computing system employing a generative simulation platform for multi-model generative simulation modeling of complex adaptive systems, cause the computing system to:
receive some combination of object, environment, or simulation data from a resource over a network;
receive a plurality of perils for analysis;
parse the received combination of data using pattern recognition;
parameterize the parsed data into objects for model building;
create and run a first model for analysis of the plurality of perils from the objects for model building to generate a first set of synthetically generated data;
create and run a second model for analysis of the plurality of perils by altering parameters of the first model to simulate random or unknown events occurring to generate a second set of synthetically generated data;
create and run a third model for analysis of the plurality of perils from the first model, the third model having isolated groups of the objects for model building, to generate a third set of synthetically generated data;
create a fourth data set using analyzed data based at least in part on the plurality of perils;
create a fifth data set by:
retrieving the first, second, and third sets of synthetically generated data based at least on the plurality of perils; and
analyzing the relationships of the second and third sets of synthetically generated data against the first set of synthetically generated data;
comparatively analyze the fourth data set against the fifth data set to determine an optimal model to use for predictive simulation of the plurality of perils;
receive a data processing workflow in the form of a graph comprising nodes representing data transformations and edges representing messages passed between the nodes;
retrieve the first, second, and third models for evaluation according to the data processing workflow of the graph;
instantiate a plurality of data processing pipelines on a distributed computing network according to the data processing workflow of the graph, each data processing pipeline representing a physical or virtual implementation of the nodes and edges of the graph, wherein two or more of the data processing pipelines are on different computer systems of a plurality of computer systems;
perform an initial execution of each of the first, second, and third models using the instantiated plurality of data processing pipelines on the distributed computing network using a set of initial parameters to obtain a model result for each of the first, second, and third models; and
determine an epistemic uncertainty value of the first model by comparing the model result of the first model with the model results of the second and third models.

20. The non-transitory media of claim 19, wherein the generative simulation platform is used to simulate pathogen behavior and pathogen control methods.

21. The non-transitory media of claim 19, wherein tasks, equations, and object groups may be decomposed into smaller tasks, equations, and groups for management.

22. The non-transitory media of claim 19, wherein the generative simulation platform simulates an engineering task including a network engineering simulation.

23. The non-transitory media of claim 19, wherein the generative simulation platform simulates complex events for purposes of pricing insurance and risk transfer.

24. The non-transitory media of claim 19, wherein the computing system is further caused to:

perform parametric evaluation of the first model by iterating it over a range of values for one parameter of the set of initial parameters of the first model to determine the first model's sensitivity to changes in the one parameter using the instantiated plurality of data processing pipelines on the plurality of computer systems;

change the one parameter of the first model to reduce the epistemic uncertainty based on the first model's sensitivity to the one parameter; and repeat the parametric evaluation, comparison, and model changes until the determined epistemic uncertainty value for the first model falls below a pre-determined threshold.

* * * * *